Jan. 22, 1963 W. SCHÄFER 3,074,334
OBJECTIVE MOUNTING IN CAMERAS
Filed Feb. 18, 1958 2 Sheets-Sheet 1

INVENTOR.
WILHELM SCHÄFER
BY
Toulmin & Toulmin
ATTORNEYS

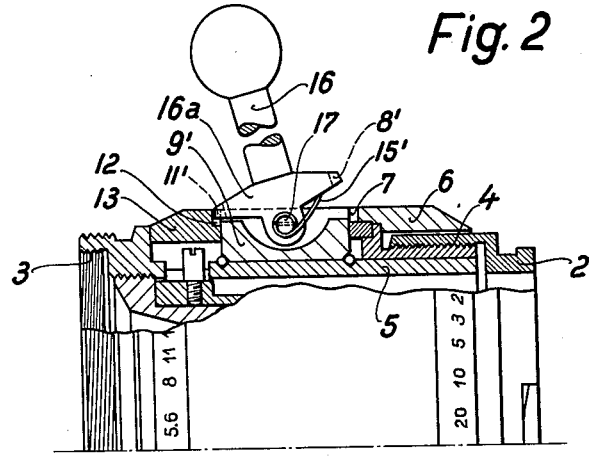
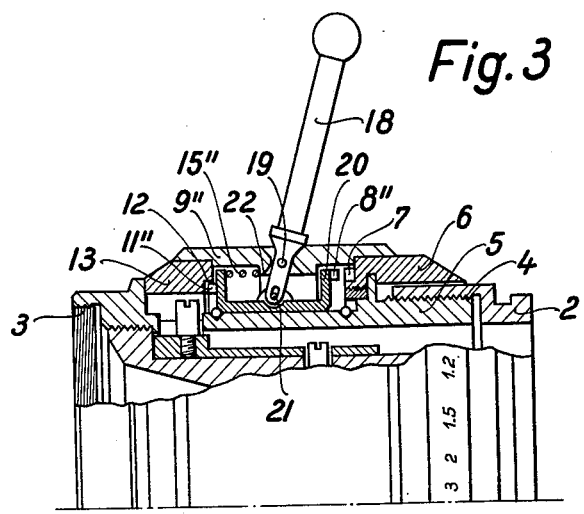

United States Patent Office 3,074,334
Patented Jan. 22, 1963

3,074,334
OBJECTIVE MOUNTING IN CAMERAS
Wilhelm Schäfer, Wetzlar (Lahn), Germany, assignor to Ernst Leitz G.m.b.H., Optische Werke, Wetzlar (Lahn), Germany
Filed Feb. 18, 1958, Ser. No. 715,974
Claims priority, application Germany Feb. 21, 1957
11 Claims. (Cl. 95—45)

The present invention relates to a mounting for the objective in cameras. More in particular the present invention relates to a mounting for the objective in cameras of the type in which the focussing is effected and the opening width of the diaphragm is adjusted by a separate adjusting ring.

When taking pictures of moving objects with a conventional cinematographic camera wherein the objective is coupled to a range finder of the camera and the measuring image of the range finder appears in the combined range finder and view finder window and wherein in addition for example in a smaller window adjacent the finder window there appears the measured value of a light meter coupled with the diaphragm adjusting ring it is very desirable for the operator to be able simultaneously while viewing the objects to supervise the distance as well as any variation of the exposure value whereby to enable him to readjust the diaphragm adjusting ring and the focussing ring at the objective.

In the known objective arrangements this constant adjustment and readjustment is very difficult and requires great skill and experience as the operator holds the camera with one hand, and effects the release while the diaphragm and adjusting ring and focussing ring are operated by the other hand without directly observing them during the adjustment.

It is easily apparent that this operation is very delicate and difficult and a constant cause of maladjustments is especially acute if both adjusting rings are positioned quite close to one another. It may easily occur when adjusting the first ring, that inadvertently the other ring is turned, thereby resulting in a false adjustment.

It is the object of the present invention to provide a mounting for the objective in cameras of the type in which the focussing and the opening width of the diaphragm are adjusted by a separate adjusting ring, which assures an easy and accurate operation of the diaphragm, adjusting and focussing means while taking pictures and, at the same time, excludes false adjustments of the opening width of the diaphragm or the focus.

This object is achieved by the present invention in which provision is made for a rotatable adjusting ring disposed between the diaphragm adjusting means and the focussing ring and coupling means adapted to connect the intermediate adjusting ring at will either to the diaphragm adjusting ring or to the focussing ring.

Preferably, the intermediate adjusting ring is axially displaceably arranged. By shifting the intermediate adjusting ring longitudinally, the coupling with either the diaphragm adjusting ring or with the focussing ring is effected.

According to another embodiment of the objective mounting of the present invention, the intermediate adjusting ring remains stationary and is linked with either the diaphragm adjusting ring or the focussing ring by shifting a coupling element, as, for example, a coupling lever.

The invention will be more fully appreciated upon the following detailed description of the accompanying drawings, wherein:

FIGURE 2 is a longitudinally sectional view of another embodiment of the objective mounting of the present invention;

FIGURE 3 is a longitudinally sectional view of a modification of the embodiment of the objective mounting shown in FIGURE 2.

Figure 1:
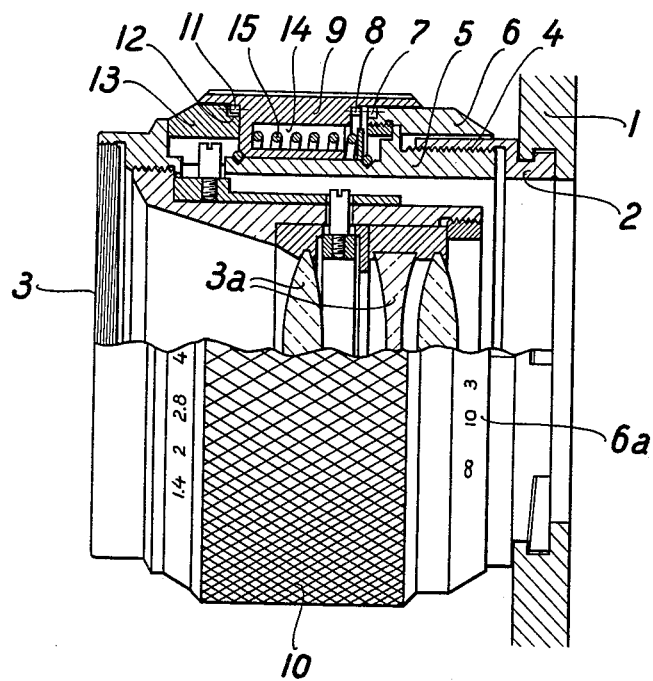
FIGURE 1 is a side elevational view, partly in section of the objective of a camera with the mounting of the present invention shown in longitudinal section.

At the casing 1 of the camera there is mounted a pin 2 of a bayonet joint of the camera. The pin 2 is provided with the threading 4 receiving a sleve 5, the latter bearing the objective lens assembly 3a and furthermore being connected with an adjusting ring 6 (focussing ring) bearing the distance measuring scale 6a. At one of its front ends the adjusting ring 6 has a toothed surface 7 facing the toothed surface 8 of the intermediate adjusting ring 9. The last-mentioned, intermediate adjusting ring 9 is positioned upon the sleeve 5 and has a roughened, knurled surface 10; another toothed portion 11 of the adjusting ring 9 is adapted to engage the gear ring 13 (diaphragm adjusting ring). The adjusting ring 9 has an excavation 14 receiving the spring 15. One of the ends of this spring 15 is supported by the inner surface of adjusting ring 6 and thus causes the toothed portions 11 and 12 of the adjusting ring 9 and the gear ring 13, respectively, to mesh.

If the adjusting ring is turned in this normal position in which the intermediate ring 9 and the gear ring 13 are coupled, the opening width of the diaphragm is changed. This does not affect the focussing of the objective. The operator can also effect the focussing without removing his hand from the adjusting ring. This is done by displacing the adjusting ring in axial direction so as to cause the two portions 7 and 8 to mesh, and then turning the intermediate adjusting ring.

While the intermediate adjusting ring 9 has a roughened, knurled surface 10, the other two adjusting rings 6 and 13 may have smooth surfaces, which is, of course, more economical.

According to another embodiment of the present invention the rotatable intermediate adjusting ring remains axially stationary, and instead of being adapted for axial displacement, the ring is equipped with a separate coupling member connecting the intermediate adjusting ring either with the diaphragm adjusting ring or with the focussing ring.

This is shown, by way of an example, in FIGURES 2 and 3 of the drawings. In FIGURE 2, the rotatable but axially non-displaceable intermediate adjusting ring 9' is connected with a one-armed lever 16 fulcrumed at 17 and bearing at its lower end a coupling link portion 16a, the latter having at both ends toothed portions 8 and 11', respectively, adapted to mesh with the toothed portions 7 and 12 of the diaphragm adjusting ring 13 and the focussing ring 6, respectively. A spring 15' urges the coupling lever 16 into engagement with the gear ring 13, this being the normal or resting position. It is, of course, also possible to so dispose the spring 15' that in its normal position the coupling portion of the lever 16 engages the adjusting ring 6, thus connecting the intermediate ring with the latter. By shifting the lever 16 the intermediate ring can be coupled with either one of the two neighboring rings 6 and 13, respectively, so that upon rotation of the ring 9', the turning force will be transmitted to either of the rings 6 and 13 through the intermediary of the lever, i.e., the lever 16 together with the link portion 16a it carries, serves as a force-transmitting component for transmitting rotation of the ring 9' to either of the rings 6 and 13.

A modification of this last-described embodiment is shown in FIGURE 3. Again, the rotatable but axially non-displaceable intermediate ring 9" is provided with a coupling member comprising a two-armed lever 18 fulcrumed against the intermediate ring as at 19 and being connected at its lowermost end with a U-shaped coupling link 20. At opposite ends the coupling link 20 bears toothed portions 8" and 11", portion 8" being adapted to mesh with the toothed portion 7 of the adjusting ring 6 and toothed portion 11" being adapted to mesh with the toothed portion 12 of gear ring 13. Spring 15" resting with one end against a nose portion 22 of intermediate ring 9" urges the coupling link 20 into its normal position in which the intermediate ring is coupled with the diaphragm adjusting ring 13. The intermediate ring 9" can be coupled with the focussing ring 6 by shifting the lever 18, thereby displacing the coupling link 20 to the right and causing the toothed portions 7 and 8" to intermesh. Thus, rotation of the ring 9" is transmitted to either of the rings 6 and 13 by way of the lever and the link 20, i.e., the coupling means themselves serve as a force-transmitting component for transmitting rotation of the ring 9" to either of the rings 6 and 13.

It will be understood that this invention is susceptible to modification in order to adapt it to different usages and conditions, and, accordingly, it is desired to comprehend such modifications within this invention as may fall within the scope of the appended claims.

What I claim is:

1. A mounting for the objective in cameras, comprising a diaphragm adjusting ring having a toothed portion, a focussing ring having a toothed portion, a rotatable but axially non-displaceable intermediate adjusting ring disposed between said focussing ring and said diaphragm adjusting ring, and coupling means comprising a two-armed lever fulcrumed on said intermediate adjusting ring for rotation therewith and having two operating positions, an arially displaceable U-shaped coupling link mounted at the inner end of said lever and having at opposite ends toothed portions engageable with the toothed portions of said diaphragm adjusting ring and said focussing ring, respectively, so that said coupling means serve as a force-transmitting component for transmitting rotation of said intermediate adjusting ring either to said diaphragm adjusting ring or to said focussing ring, so that in one position said link is coupled to one of said diaphragm adjusting ring and said focussing ring and in the other position to the other of said rings.

2. A mounting for the objective in cameras, comprising a diaphragm adjusting ring having a toothed portion, a focussing ring having a toothed portion, a rotatable but axially non-displaceable intermediate adjusting ring disposed between said focussing ring and said diaphragm adjusting ring, and coupling means comprising a two-armed lever fulcrumed on said intermediate adjusting ring for rotation therewith, and having two operating positions, an axially displaceable U-shaped coupling link mounted at the inner end of said lever and having at opposite ends toothed portions engageable with the toothed portions of said diaphragm adjusting ring and said focussing ring, respectively, so that in one position said link is coupled to one of said diaphragm adjusting ring and said focussing ring and in the other position to the other of said rings and spring means surging said coupling link into engagement with one of said diaphragm adjusting ring and said focussing ring but permitting said coupling link to be moved into engagement with said focussing ring, so that said coupling means serve as a force-transmitting component for transmitting rotation of said intermediate adjusting ring either to said diaphragm adjusting ring or to said focussing ring.

3. A mounting for the objective in cameras, comprising a diaphragm adjusting ring, a focussing ring, a rotatable but axially non-displaceable intermediate adjusting ring disposed between said focussing ring and said diaphragm adjusting ring, coupling means having two operating positions carried on said intermediate adjusting ring for rotation therewith, and means on said coupling means for non-rotatably coupling said intermediate adjusting ring and said diaphragm adjusting ring to each other in one position for non-rotatably connecting said intermediate adjusting ring and said focussing ring to each other in the other position, so that said coupling means serves as a force-transmitting component for transmitting rotation of said intermediate adjusting ring to one of said diaphragm adjusting ring and said focussing ring at any time in response to the position which said coupling means occupy.

4. A mounting for the objective in cameras, comprising a diaphragm adjusting ring having a toothed portion, a focussing ring having a toothed portion, a rotatable but axially non-displaceable intermediate adjusting ring disposed between said focussing ring and said diaphragm adjusting ring, and coupling means having two operating positions carried on said intermediate adjusting ring for rotation therewith, said coupling means having toothed means on both ends thereof engageable with the toothed portions of said diaphragm adjusting ring and said focussing ring so that in one position said toothed means are in mesh with said toothed portion of said diaphragm adjusting ring and in the other position said toothed means are in mesh with said toothed portion of said focussing ring, said coupling means thus serving as a force-transmitting component for non-rotatably connecting said intermediate adjusting ring to one of said diaphragm adjusting ring and said focussing ring, depending upon the position which said coupling means occupy.

5. A mounting for the objective in cameras, comprising a diaphragm adjusting ring having a toothed portion, a focussing ring having a toothed portion, a rotatable but axially non-displaceable intermediate adjusting ring disposed between said focussing ring and said diaphragm adjusting ring, and coupling means having two operating positions carried on said intermediate adjusting ring for rotation therewith, said coupling means having first and second toothed means engageable with said toothed portion of said diaphragm adjusting ring and with said toothed portion of said focussing ring, respectively, so that in one position said first toothed means is in mesh with said toothed portion of said diaphragm adjusting ring and in the other position said second toothed means is in mesh with said toothed portion of said focussing ring, said coupling means thus serving as a force-transmitting component for non-rotatably connecting said intermediate adjusting ring to one of said diaphragm adjusting ring and said focussing ring, depending upon the position which said coupling means occupy.

6. A mounting for the objective in cameras, comprising, in combination: a diaphragm adjusting ring, a focussing ring, a single manual adjusting ring; and means on said adjusting ring for non-rotatably coupling said adjusting ring to only one of said diaphragm adjusting ring and said focussing ring at any time, whereby said manual adjusting ring actuates individually said diaphragm adjusting ring and said focussing ring.

7. A mounting for the objective in cameras, comprising, in combination: a diaphragm adjusting ring; a focussing ring; and a manual adjusting ring arranged intermediate said diaphragm adjusting ring and said focussing ring and being axially movable therebetween, and means on said manual adjusting ring for non-rotatably connecting said adjusting ring to only one of said diaphragm adjusting ring and said focussing ring at any time so that said manual adjusting ring has; a first position wherein said manual adjusting ring is non-rotatably coupled to said diaphragm adjusting ring but disconnected from said focussing ring and a second position wherein said manual adjusting ring is non-rotatably coupled to said focussing ring but disconnected from said diaphragm adjusting ring, whereby said manual adjusting ring actuates said diaphragm adjusting ring and said focussing ring individually.

8. A mounting for the objective in cameras, comprising, in combination: a diaphragm adjusting ring having a toothed portion; a focussing ring having a toothed portion; and an axially movable manual adjusting ring arranged intermediate said diaphragm adjusting ring and said focussing ring, said manual adjusting ring having toothed means on both ends thereof engageable with the toothed portions of said diaphragm adjusting and focussing rings, the axial length of said toothed portions and toothed means being such so that said manual adjusting ring has; a first position wherein said toothed means are in non-rotatable engagement with said toothed portion of said diaphragm adjusting ring but out of engagement with said toothed portion of said focussing ring and a second position wherein said toothed means are in non-rotatable engagement with said toothed portion of said focussing ring but out of engagement with said toothed portion of said diaphragm adjusting ring, whereby said manual adjusting ring actuates said diaphragm adjusting ring and said focussing ring individually.

9. A mounting for the objective in cameras, comprising, in combination: a diaphragm adjusting ring having a toothed portion; a focussing ring having a toothed portion; an axially movable manual adjusting ring arranged intermediate said diaphragm adjusting ring and said focussing ring, said manual adjusting ring having toothed means on both ends thereof engageable with the toothed portions of said diaphragm adjusting and focussing rings, the axial length of said toothed portions and toothed means being such so that said manual adjusting ring has; a first position wherein said toothed means are in non-rotatable engagement with said toothed portion of said diaphragm adjusting ring but out of engagement with said toothed portion of said focussing ring and a second position wherein said toothed means are in non-rotatable engagement with said toothed portion of said focussing ring but out of engagement with said toothed portion of said diaphragm adjusting ring, whereby said manual adjusting ring actuates said diaphragm adjusting ring and said focussing ring individually; and spring means urging said adjusting ring into one of said first and second positions thereof.

10. A mounting for the objective in cameras, comprising a diaphragm adjusting ring having a toothed portion, a focussing ring having a toothed portion, a rotatable but axially non-displaceable intermediate adjusting ring disposed between said focussing ring and said diaphragm adjusting ring, and coupling means comprising a lever fulcrumed on said intermediate adjusting ring and having two operating positions, and an axially displaceable coupling link connected to said lever and having at opposite ends toothed portions engageable with the toothed portions of said diaphragm adjusting ring and said focussing ring, respectively, so that in one position said link is coupled to one of said diaphragm adjusting ring and said focussing ring and in the other position to the other of said rings.

11. A mounting for the objective in cameras, comprising a diaphragm adjusting ring having a toothed portion, a focussing ring having a toothed portion, a rotatable but axially non-displaceable intermediate adjusting ring disposed between said focussing ring and said diaphragm adjusting ring, and coupling means comprising a lever fulcrumed on said intermediate adjusting ring and having two operating positions, and an axially displaceable coupling link connected to said lever and having at opposite ends toothed portions engageable with the toothed portions of said diaphragm adjusting ring and said focussing ring, respectively, so that in one position said link is coupled to one of said diaphragm adjusting ring and said focussing ring and in the other position to the other of said rings, and spring means urging said coupling means into engagement with one of said diaphragm adjusting ring and said focussing ring.

References Cited in the file of this patent

UNITED STATES PATENTS

| | | |
|---|---|---|
| 1,627,722 | Balston | May 10, 1927 |
| 1,670,457 | Langford | May 22, 1928 |
| 2,590,161 | Dorsey | Mar. 25, 1952 |
| 2,735,528 | Dodge | Feb. 21, 1956 |
| 2,878,734 | Colaiace | Mar. 24, 1959 |

FOREIGN PATENTS

| | | |
|---|---|---|
| 290,320 | Switzerland | Aug. 1, 1953 |
| 531,889 | Italy | Aug. 6, 1955 |
| 312,586 | Switzerland | Mar. 29, 1956 |
| 769,081 | Great Britain | Feb. 27, 1957 |
| 202,854 | Austria | Sept. 15, 1958 |